United States Patent [19]

Iijima et al.

[11] Patent Number: 5,770,641
[45] Date of Patent: Jun. 23, 1998

[54] VINYL CHLORIDE-BASED PLASTISOL

[75] Inventors: Susumu Iijima, Toyonaka; Tetsuya Yamamoto, Ibaraki, both of Japan

[73] Assignee: Sumitomo Chemical Company, Limited, Osaka, Japan

[21] Appl. No.: 186,618

[22] Filed: Jan. 26, 1994

[30] Foreign Application Priority Data

Jan. 26, 1993 [JP] Japan .................................... 5-010711

[51] Int. Cl.$^6$ ...................................................... C08K 3/00
[52] U.S. Cl. .......................... 523/342; 524/387; 524/388
[58] Field of Search .................................... 524/388, 387; 523/342

[56] References Cited

U.S. PATENT DOCUMENTS

| | | | |
|---|---|---|---|
| 3,208,965 | 9/1965 | Kühne | 260/30.6 |
| 4,203,879 | 5/1980 | DeWald et al. | 260/23 |
| 4,269,743 | 5/1981 | Hulyalkar et al. | 260/23 |
| 4,429,071 | 1/1984 | Itoh et al. | 524/569 |
| 4,448,945 | 5/1984 | Fink et al. | 526/193 |
| 4,581,413 | 4/1986 | Kim | 524/222 |

FOREIGN PATENT DOCUMENTS

0551684A1  7/1993  European Pat. Off. .

OTHER PUBLICATIONS

Derwent Pub. Ltd., 87–331345, (JP 62–236848 16 Jan. 1987).

*Primary Examiner*—Peter D. Mulcahy
*Attorney, Agent, or Firm*—Birch, Stewart, Kolasch & Birch, LLP

[57] ABSTRACT

A vinyl chloride-based plastisol which contains a) powder of a vinyl chloride polymer obtainable by spray drying an aqueous dispersion of a vinyl chloride polymer, the dispersion containing a polyhydric alcohol in an amount of 0.3 to 5 parts by weight per 100 parts by weight of the vinyl chloride polymer, and b) a plasticizer in an amount of 30 to 300 parts by weight per 100 parts by weight of the vinyl chloride polymer, gives a molded article having a good matte finishing effect.

16 Claims, No Drawings

VINYL CHLORIDE-BASED PLASTISOL

BACKGROUND OF THE INVENTION

1. Field of the Invention

The present invention relates to a vinyl chloride-based plastisol, and to preparation and use thereof. Particularly, it relates to a vinyl chloride-based plastisol which can give a molded article having an excellent matte finishing effect, and to preparation and use thereof.

2. Related Art

A matte article having low surface gloss, dry feeling and an appearance of repose is required in applications of a wall covering, a flooring, an automobile internal part, an electrical wire, a daily use article and the like comprising a vinyl chloride-based plastisol.

As a method for matting these vinyl chloride-based plastisol article, methods for giving the matte finishing effect due to the design of the formulation of the plastisol are proposed. For example, (1) a method of blending vinyl chloride resins having different particle sizes, (2) a method of using a previously partially cross-linked vinyl chloride resin as disclosed in U.S. Pat. No. 4,429,071, and the like are known.

However, the method (1) has the disadvantages that the molding conditions in a molding step give a strong effect on the product so that nonuniformity of the matte finishing effect easily occurs due to a temperature deflection and that when a molding temperature is increased in order to a molding speed, the matte finishing effect is insufficient.

The method (2) has the disadvantage that, although the molding conditions give little effect, the molded article has poor surface smoothness due to the presence of the cross-linked material having the insolubility or high melt viscosity, and particularly the molded article has nonuniform foam cells in a foamed article.

SUMMARY OF THE INVENTION

An object of the present invention is to provide a plastisol which can give a molded article having an excellent matte finishing effect and low dependency on molding conditions, and a preparation and a use of the plastisol. A particular object of the present invention is to provide a plastisol which can give a matte foamed article having excellent surface smoothness and uniform foam cells, and a preparation and a use of the plastisol.

The present invention provides a vinyl chloride-based plastisol comprising a) powder of a vinyl chloride polymer obtainable by spray drying an aqueous dispersion of a vinyl chloride polymer prepared by the emulsion polymerization or the microsuspension polymerization of vinyl chloride or a mixture of vinyl chloride and an unsaturated compound copolymerizable with vinyl chloride, said dispersion containing a polyhydric alcohol in an amount of 0.3 to 5 parts by weight per 100 parts by weight of the vinyl chloride polymer, and b) a plasticizer in an amount of 30 to 300 parts by weight per 100 parts by weight of the vinyl chloride polymer.

The present invention also provides a method for preparing a molded article which comprises using the above plastisol.

Further, the present invention provides a method for preparing a vinyl chloride-based plastisol, said plastisol comprising a vinyl chloride polymer and a plasticizer, said method comprising steps of 1) spray drying an aqueous dispersion of the vinyl chloride polymer prepared by the emulsion polymerization or the microsuspension polymerization of vinyl chloride or a mixture of vinyl chloride and an unsaturated compound copolymerizable with vinyl chloride to prepare powder of the vinyl chloride polymer, and then 2) mixing the powder with the plasticizer in an amount of 30 to 300 parts by weight per 100 parts by weight of the vinyl chloride polymer, said dispersion containing a polyhydric alcohol in an amount of 0.3 to 5 parts by weight per 100 parts by weight of the vinyl chloride polymer.

DETAILED DESCRIPTION OF THE INVENTION

The vinyl chloride polymer used in the present invention is a homopolymer of a vinyl chloride monomer alone or a copolymer of a vinyl chloride monomer and a monomer copolymerizable with the vinyl chloride monomer. Specific examples of the copolymerizable monomer are alkyl vinyl esters such as vinyl acetate and alkyl (meth)acrylate esters such as methyl acrylates and methyl methacrylate.

As a method for polymerizing the monomers, for example, an microsuspension polymerization and an emulsion polymerization using an aqueous medium containing an emulsifying agent can be used. The emulsifying agent used in the polymerization may be a usual anionic emulsifying agent or nonionic emulsifying agent. The amount of the emulsifying agent is from 0.1 to 3 parts by weight per 100 parts by weight of the total monomers.

The polymerization gives an aqueous dispersion of the vinyl chloride polymer. For the vinyl chloride-based plastisol preparation, powder of the vinyl chloride polymer can be obtained by spray drying the aqueous dispersion. A method for spray drying may be known one and is not limited.

The plasticizer used in the present invention is not limited, may be known one used for the vinyl chloride-based plastisol, and may be an organic acid ester such as phthalic acid ester, for example, DOP (dioctyl phthalate) or an epoxidized soybean oil.

The amount of the plasticizer may be a known amount, and may be usually from 30 to 300 parts by weight per 100 parts by weight of the vinyl chloride polymer.

The polyhydric alcohol used in the present invention is a compound having at least two hydroxyl groups in one molecule. Specific examples of the polyhydric alcohol are glycerol, trimethylolpropane, ditrimethylolpropane, pentaerythritol and dipentaerythritol. Trimethylolpropane is particularly preferable, since it gives better effect.

The amount of the polyhydric alcohol is from 0.3 to 5 parts by weight, preferably from 0.5 to 3 parts by weight per 100 parts by weight of the vinyl chloride polymer. If the amount is smaller than 0.3 parts by weight, the matte finishing effect is insufficient. If the amount is larger than 5 parts by weight, the matte finishing effect is not so improved compared with the addition amount of the polyhydric alcohol and the molded article has poor surface smoothness.

In order to incorporate the polyhydric alcohol in the vinyl chloride-based plastisol, it is suitable that the aqueous dispersion of the vinyl chloride polymer contains the polyhydric alcohol before the spray drying.

In order that the aqueous dispersion of the vinyl chloride polymer contains the polyhydric alcohol before the spray drying, it is possible to use a method of previously adding the polyhydric alcohol to the aqueous dispersion before the polymerization of the vinyl chloride polymer, and a method of adding and mixing the polyhydric alcohol with the aqueous dispersion after the polymerization. In these methods, the easy and homogeneous dispersion can be conducted by the mere mixing and stirring. It is easy in view of the preparation to add the polyhydric alcohol to the aqueous dispersion of the vinyl chloride polymer.

The spray drying of the aqueous dispersion of the vinyl chloride polymer gives powder of the vinyl chloride polymer. A particle size of the powder for the plastisol is usually from 2 to 20 μm, preferably from 3 to 10 μm.

Generally, the vinyl chloride polymer powder is mixed with the plasticizer and if necessary, a filler, a stabilizing agent, a diluent and the like to prepare the vinyl chloride-based plastisol.

Also in the present invention, the resultant vinyl chloride polymer powder is mixed with the above materials to prepare the vinyl chloride-based plastisol.

If the polyhydric alcohol is added during the mixing between the powder and the above materials, it is difficult to disperse homogeneously the polyhydric alcohol so that the molded article disadvantageously has poor surface smoothness.

The vinyl chloride-based plastisol can be worked in various known methods to prepare a molded article.

For example, in order to conduct a foam molding by the use of the vinyl chloride-based plastisol, a blowing agent is used. Specific examples of the blowing agent are compounds used as a blowing agent for a vinyl chloride resin, such as azodicarbonamide, azobisisobutyronitrile, dinitrosopentamethylene tetramine, 4,4'-oxybis(benzenesulfonyl hydrazide), p-toluenesulfonyl hydrazide and the like. Two or more of these compounds may be used. A blowing aid may be used so as to lower a decomposition temperature of the blowing agent. The amount of the blowing agent is usually not larger than 6 parts by weight, preferably not larger than 4 parts by weight per 100 parts by weight of the vinyl chloride polymer.

The vinyl chloride-based plastisol gives a matte molded article having low surface gloss and good appearance. Particularly, it gives a matte foamed molded article having excellent surface smoothness and uniform foam cells.

The molded article includes a wall covering, a flooring, a leather, a fabric, working gloves, a toy, a daily use article and the like.

The preparation method of the present invention gives the vinyl chloride-based plastisol having the above excellent properties.

PREFERRED EMBODIMENT OF THE INVENTION

The present invention will be illustrated by the following Examples which do not limit the present invention. In the Examples, parts and % are by weight, unless specified. The properties were measured as follows:
Coarse particles in plastisol
A maximum value of a particle size of coarse particles is measured according to the method of JIS K-5400.
Matte finishing effect of molded article
A value of 60° reflectance (gloss) (%) is measured by a varied-angle gloss meter (VG-1D) manufactured by Nippon Denshoku Kogyo Ltd. and evaluated. The smaller this value is, the lower the surface gloss is and the better the matte finishing effect is.
Size of foam cell
A cell size is measured by observing a cross section of a foamed sheet by a magnifier.

EXAMPLE 1

The atmosphere in a 100 L glass-lining autoclave is deaerated. Deionized water (40 kg), a vinyl chloride monomer (16 kg), sodium lauryl sulfate (140 g), stearyl alcohol (240 g) and di-2-ethylhexylperoxydicarbonate (7.5 g) were charged in the autoclave, homogenized by a homogenizer, and heated to 49° C. to initiate the polymerization. When the pressure in the reactor decreased by 0.5 kg/cm$^2$, a vinyl chloride monomer (18 kg) was added to continue the polymerization. When the pressure in the reactor decreased by 0.5 kg/cm$^2$ again, the polymerization was discontinued and an unreacted monomer was recovered to give an aqueous dispersion of a vinyl chloride polymer.

Sodium lauryl sulfate (0.4 parts), polyoxyethylenealkyl phenyl ether (0.4 parts) and trimethylolpropane (2.0 parts) were added to the aqueous dispersion (the amount is based on 100 parts of the polymer) and homogeneously stirred. The mixture was spray dried by a spray dryer (a rotary atomizer-type dryer manufactured by Nilo A/S) to prepare powder of the vinyl chloride polymer.

Then, di-2-ethylhexyl phthalate plasticizer (65 parts), calcium carbonate (50 parts) (Whiton H manufactured by Shiraishi Kogyo Ltd.), titanium oxide (15 parts) (R-820 manufactured by Ishihara Sangyo Ltd.), a blowing agent (3 parts) (AZH manufactured by Ohtsuka Kagaku Ltd.) and a stabilizing agent (3 parts) (KF 65 J 2 manufactured by Kyodo Yakuhin Ltd.) and a diluent (5 parts) were added to and mixed with the vinyl chloride polymer powder (100 parts) in a mixer to prepare a plastisol.

Then, coarse particles in the resultant plastisol were measured.

The plastisol was coated by a knife coater on a flame retarded paper to prepare a layer of 150 μm in thickness. The paper was thermally treated at 150° C. for 30 seconds in an oven so that the coated layer was in a semi-gel state. After cooling, the sample was cut into strips and thermally treated at 220° C. for 50 seconds in an oven to prepare a foamed sheet. The properties of the coated layer were evaluated. The results are shown in Table 1.

EXAMPLES 2 TO 4 AND COMPARATIVE EXAMPLES 1 TO 3

The procedure in Example 1 was repeated except that the type and amount of the polyhydric alcohols added to the aqueous dispersion were as shown in Table 1.

The results are shown in Table 1.

EXAMPLE 5

The atmosphere in a 100 L glass-lining autoclave is deaerated. Deionized water (40 kg), a vinyl chloride monomer (16 kg), sodium lauryl sulfate (140 g), stearyl alcohol (240 g) and di-2-ethylhexylperoxydicarbonate (7.5 g) were charged in the autoclave, and homogenized by a homogenizer. Trimethylolpropane (340 g) was added to the mixture and heated to 490° C. to initiate the polymerization. When the pressure in the reactor decreased by 0.5 kg/cm$^2$, a vinyl chloride monomer (18 kg) was added to continue the polymerization. When the pressure in the reactor decreased by 0.5 kg/cm$^2$ again, the polymerization was discontinued and an unreacted monomer was recovered to give an aqueous dispersion of a vinyl chloride polymer.

Sodium lauryl sulfate (0.4 parts) and polyoxyethylenealkyl phenyl ether (0.4 parts) were added to the aqueous dispersion (the amount is based on 100 parts of the polymer) and homogeneously stirred. The mixture was spray dried to prepare powder of the vinyl chloride polymer in the same manner as in Example 1.

Also in the same manner as in Example 1, the vinyl chloride polymer powder was used to prepare the plastisol and the foamed sheet. The properties were evaluated. The results are shown in Table 1.

COMPARATIVE EXAMPLE 4

The powder of the vinyl chloride polymer was obtained by spray drying the aqueous dispersion of Example 1 without adding trimethylolpropane.

Dioctyl phthalate (DOP) (65 parts), calcium carbonate (50 parts) (Whiton H manufacture by Shiraishi Kogyo Ltd.), titanium oxide (15 parts) (R-820 manufactured by Ishihara Sangyo Ltd.), a blowing agent (3 parts) (AZH manufactured by Ohtsuka Kagaku Ltd.), a stabilizing agent (3 parts) (KF 65 J 2 manufactured by Kyodo Yakuhin Ltd.), trimethylolpropane (2 parts) and a diluent (5 parts) were added to and mixed with the vinyl chloride polymer powder (100 parts) in a mixer.

The plastisol was evaluated, and the foamed sheet was prepared and evaluated as in Example 1. The results are shown in Table 1.

TABLE 1

| Example No. | Polyhydric alcohol Type | Polyhydric alcohol Amount | Matte finishing effect | Coarse particle ($\mu$m) | Cell size (mm) |
|---|---|---|---|---|---|
| 1 | TMP | 2.0 | 3.9 | 90 | 0.17 |
| 2 | DTMP | 2.0 | 6.5 | 85 | 0.15 |
| 3 | PE | 2.0 | 5.3 | 90 | 0.15 |
| 4 | DPE | 2.0 | 7.0 | 85 | 0.14 |
| 5 | TMP | 1.0 | 4.0 | 85 | 0.16 |
| Com. 1 | None | — | 8.1 | 85 | 0.12 |
| Com. 2 | TMP | 0.2 | 8.0 | 85 | 0.15 |
| Com. 3 | TMP | 6.0 | 4.1 | 95 | 0.35 |
| Com. 4 | TMP | 2.0 | 3.5 | >250 | 0.30 |

Note)
TMP: trimethylolpropane
DTMP: ditrimethylolpropane
PE: pentaerythritol
DPE: dipentaerythritol

EXAMPLES 6 AND 7 AND COMPARATIVE EXAMPLE 5

The procedure in Example 1 was repeated except that the type and amount of the polyhydric alcohols added to the aqueous dispersion as shown in Table 2 and the blowing agent was not added for the preparation of the plastisol.

The results are shown in Table 2.

TABLE 2

| Example No. | Polyhydric alcohol Type | Polyhydric alcohol Amount | Matte finishing effect | Coarse particle ($\mu$m) |
|---|---|---|---|---|
| 6 | TMP | 2.0 | 10.6 | 85 |
| 7 | TMP | 1.0 | 4.8 | 80 |
| Com. 5 | None | — | 36.0 | 80 |

What is claimed is:

1. A vinyl chloride-based plastisol comprising
   a) powder of a vinyl chloride polymer obtained by spray drying an aqueous dispersion of a vinyl chloride polymer prepared by the emulsion polymerization or the microsuspension polymerization of vinyl chloride or a mixture of vinyl chloride and an unsaturated compound copolymerizable with vinyl chloride, said dispersion containing a polyhydric alcohol in an amount of 0.3 to 5 parts by weight per 100 parts by weight of the vinyl chloride polymer, and
   b) a plasticizer in an amount of 30 to 300 parts by weight per 100 parts by weight of the vinyl chloride polymer.

2. The vinyl chloride-based plastisol according to claim 1, wherein the polyhydric alcohol is trimethylolpropane.

3. A method for preparing a vinyl chloride-based plastisol, said plastisol comprising a vinyl chloride polymer and a plasticizer,
   said method comprising steps of
   1) spray drying an aqueous dispersion of the vinyl chloride polymer prepared by the emulsion polymerization or the microsuspension polymerization of vinyl chloride or a mixture of vinyl chloride and an unsaturated compound copolymerizable with vinyl chloride to prepare powder of the vinyl chloride polymer, and then
   2) mixing the powder with the plasticizer in an amount of 30 to 300 parts by weight per 100 parts by weight of the vinyl chloride polymer,
   said dispersion containing a polyhydric alcohol in an amount of 0.3 to 5 parts by weight per 100 parts by weight of the vinyl chloride polymer.

4. The vinyl chloride-based plastisol according to claim 1, wherein the polyhydric alcohol is selected from the group consisting of glycerol, trimethylolpropane, ditrimethylolpropane, pentaerythritol and dipentaerythritol.

5. The vinyl chloride-based plastisol according to claim 1, wherein the polyhydric alcohol is ditrimethylolpropane.

6. The vinyl chloride-based plastisol according to claim 1, wherein the polyhydric alcohol is pentaerythritol.

7. The vinyl chloride-based plastisol according to claim 1, wherein the polyhydric alcohol is dipentaerythritol.

8. The method for preparing a vinyl chloride-based plastisol according to claim 3, wherein the polyhydric alcohol is selected from the group consisting of glycerol, trimethylolpropane, ditrimethylolpropane, pentaerythritol and dipentaerythritol.

9. The method for preparing a vinyl chloride-based plastisol according to claim 3, wherein the polyhydric alcohol is ditrimethylolpropane.

10. The method for preparing a vinyl chloride-based plastisol according to claim 3, wherein the polyhydric alcohol is pentaerythritol.

11. The method for preparing a vinyl chloride-based plastisol according to claim 3, wherein the polyhydric alcohol is dipentaerythritol.

12. The method for preparing a vinyl chloride-based plastisol according to claim 3, wherein the polyhydric alcohol is trimethylolpropane.

13. The vinyl chloride-based plastisol according to claim 1, wherein said polyhydric alcohol is present in an amount of 0.5 to 3 parts by weight per 100 parts by weight of the vinyl chloride polymer.

14. The method for preparing a vinyl chloride-based plastisol according to claim 3, wherein said polyhydric alcohol is present in an amount of 0.5 to 3 parts by weight per 100 parts by weight of the vinyl chloride polymer.

15. The vinyl chloride-based plastisol according to claim 1, wherein said vinyl chloride polymer powder has a particle size of 3 to 10 microns.

16. The method for preparing a vinyl chloride-based plastisol according to claim 3, wherein said vinyl chloride polymer powder has a particle size of 3 to 10 microns.

* * * * *